(No Model.)

E. WILLIGEROD & L. NERESHEIMER.
FEED BAG.

No. 376,570.          Patented Jan. 17, 1888.

WITNESSES:
Jas. P. Ewbank.
E. R. Brown

INVENTORS
EDWARD WILLIGEROD.
LOUIS NERESHEIMER.
BY Francis C. Bower
ATTORNEY.

UNITED STATES PATENT OFFICE

EDWARD WILLIGEROD AND LOUIS NERESHEIMER, OF NEW YORK, N. Y.

FEED-BAG.

SPECIFICATION forming part of Letters Patent No. 376,570, dated January 17, 1888.

Application filed September 1, 1887. Serial No. 218,450. (No model.)

*To all whom it may concern:*

Be it known that we, EDWARD WILLIGEROD and LOUIS NERESHEIMER, citizens of the United States, and residents of New York, in the county of New York and State of New York, have invented a certain new and useful Improvement in Feed-Bags, of which the following is a specification.

The object of our invention is to provide a feed-bag for horses and other animals that will automatically keep the food at all times in proper relation to the animal's mouth, so as to enable the animal to readily reach its contents, and at the same time provide a simple means that will not only afford ventilation while eating, but will also serve as a sieve for the dust and dirt that may be in the food, and, moreover, prevent throwing and wasting.

The invention consists in the novel construction of the feed-receptacle itself, which is intended to be suspended from the horse's head, and is composed of a perforated base of any desired shape, curved at the bottom and connected at its top, by means of a canvas band or other flexible material, to a perforated intermediate metallic hoop or band, to the top of which hoop or band is secured another piece of canvas, which forms the upper part of the bag, to which the outer side tubes are riveted, while the inner side tubes are secured to the top of the dish-shaped base composing the bottom of the feed-receptacle, which tubes are provided with a spiral spring secured to the top of the outer tube and the bottom of the inner tube for telescopically operating the tubes and for balancing the bag, so that as the horse eats the contents the bag is automatically drawn to his mouth, and the food is thereby always kept within convenient eating distance, as hereinafter more particularly described.

Figure 1:
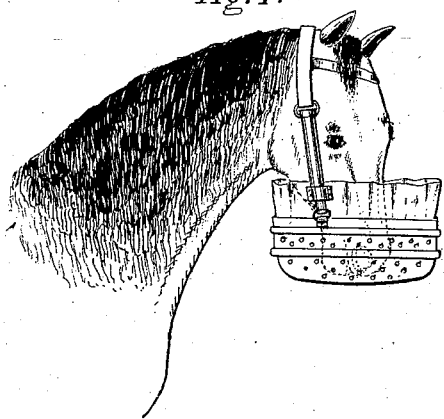
Figure 2:
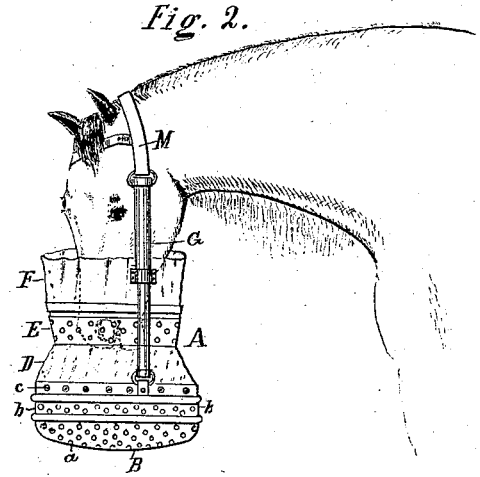
Figure 3:
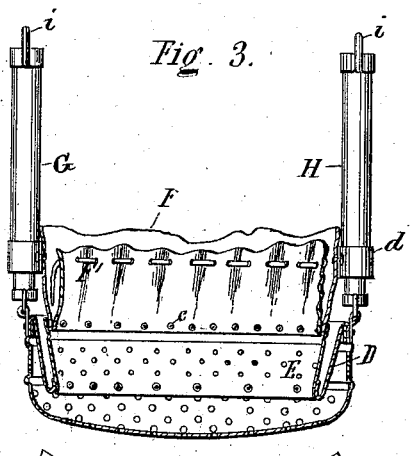
Figure 4:
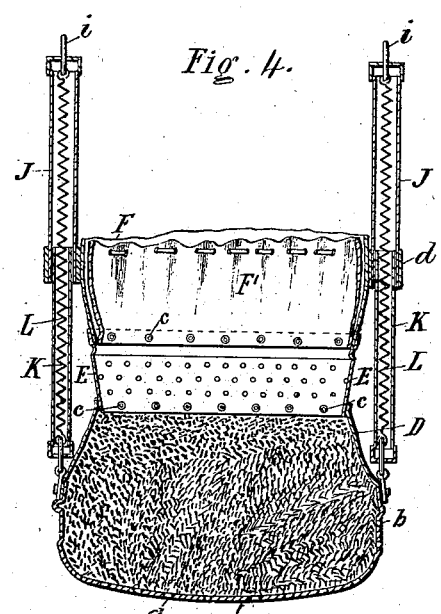
Figure 5:
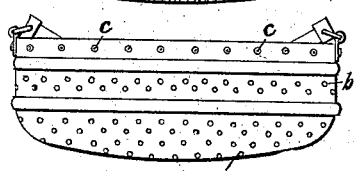

In the accompanying drawings, Figure 1 represents a nose-bag illustrating our invention as applied to a horse's head, showing the same in an elevated position emptied of its contents. Fig. 2 represents the position the feed-bag will occupy when filled and applied to the animal's head for use. Fig. 3 represents a vertical sectional view showing the feed-receptacle detached from the animal and emptied of its contents. Fig. 4 represents a vertical section showing the feed-receptacle provided with its contents ready for use. Fig. 5 represents the feed-receptacle closed and empty.

Similar letters of reference indicate corresponding parts.

The feed bag or receptacle A consists of a dish-shaped base, B, of any desired form or material, curved on its lower part and having perforations $a\ b$ on its bottom and sides, which not only serve as ventilators, but also act as a sieve for any dirt or dust that may be in the food. To the top of the base B is attached, as by rivets $c$, the lower part of a band of canvas or other flexible material, D, while the upper edge of the canvas, D, is attached, as by rivets, to a perforated metallic or leather band or hoop, E, to the top of which hoop is fastened another piece of canvas, F, having a free portion, F', which forms the cover of the bag, and which free portion may be provided with a drawing-string for closing it. The circumference of the hoop or band E is less than the circumference of the base B, and the size of the top and bottom band, D, is made to correspond in circumference to the base B and the hoop E, so that the band E and the canvas band D will telescope within the base B, as shown in Figs. 1, 3, and 5, as the feed-receptacle is emptied of its contents, while the bag will assume by the weight of the feed the extended shape illustrated in Figs. 2 and 4.

The letters G H indicate two side pieces arranged diametrically opposite to each other and composed of the outer metallic tube, J, riveted at its bottom to the piece of canvas F by means of a keep, $d$, while the inner metallic side tubes, K, are properly secured to the top of the base B, which tubes J K are provided with spiral springs L L, which springs are suitably fastened interiorly at the top of the outer tube, J, and interiorly at the bottom of the inner tube, K, so that the inner tube will gradually automatically telescope in the outer tube as the bag is emptied of its contents, and at the same time causing the base-piece B to rise and telescopically surround the metallic or other hoop or band E, and the canvas band D to gradually automatically be surrounded by the base B, thereby always keeping the food within convenient eating distance of the animal's mouth until it is entirely consumed.

It is evident that instead of arranging the base-piece to rise and surround the hoop E the hoop E may be constructed so as to surround the base-piece and to pass outside thereof, in which case the side pieces are secured to the inside of the hoop or band.

To the upper part of the side pieces, G H, are secured by means of rings $i$ a band or strap, M, for suspending the receptacle from the animal's head.

What we claim as new, and desire to secure by Letters Patent, is—

1. A feed-receptacle constructed with a metallic dish-shaped base, B, curved on its lower part, having suitably attached to its upper edge a band of flexible material, D, to which is connected a perforated band or hoop, E, having fastened to its upper portion a piece of flexible material, F, which forms the top of the bag, substantially as shown and described.

2. In a feed-receptacle, the dish-shaped base B, attached by a band of canvas or other flexible material, D, to a perforated intermediate hoop or band of metal, E, or other suitable material, having a piece of canvas, F, fastened to its upper part to form the cover, in combination with the side pieces consisting of the telescopic inner and outer tubes, J K, and the spiral springs L L, arranged therein, said tubes J being riveted at their bottoms to the piece of canvas F, and the inner tubes, K, secured to the top of the base B, for automatically adjusting the feed-bag to the mouth of the animal, substantially as and for the purpose herein described.

3. In a feed-receptacle, the dish-shaped base B, connected to an intermediate band or hoop, E, by means of a piece of flexible material, D, in combination with side pieces constructed, as described and shown, to gradually cause the base B to automatically rise and telescope with the band E and canvas band D as the feed-bag is emptied of its contents, thereby always keeping the food within a convenient eating distance of the animal's mouth until the food is entirely consumed, substantially as herein shown and described.

EDWARD WILLIGEROD.
LOUIS NERESHEIMER.

Witnesses:
FRANCIS C. BOWEN,
JAS. S. EWBANK.